UNITED STATES PATENT OFFICE.

J. W. HARMON, OF BROOKLYN, NEW YORK.

IMPROVED COMPOSITION FOR FLOOR-CLOTHS.

Specification forming part of Letters Patent No. 16,918, dated March 31, 1857.

*To all whom it may concern:*

Be it known that I, JOSEPH W. HARMON, of the city of Brooklyn, county of Kings, and State of New York, have invented a new and Improved Compound for Floor-Cloths and other purposes.

The nature of my invention consists in mixing the following ingredients—viz., residuum from stills of candle-factories, spirits of turpentine, rosin-oil, yellow ocher, Venetian red, whiting, oil-cake, umber, lime, and litharge.

I make no claim to producing or making any single one of the above-named ingredients; but I claim them combined as a compound.

To enable others skilled in the arts to make and use my invention, I will proceed to describe the same.

I place in a kettle or other vessel about eight pounds of the above named residuum and apply sufficient heat to melt the same. I then add about eight pounds of spirits of turpentine, eight pounds of rosin-oil, sixteen pounds of yellow ocher, sixteen pounds of Venetian red, sixteen pounds of whiting, three pounds of oil-cake, one and a half pound umber, three pounds of fresh-slaked lime, three-fourths of a pound of fresh litharge; and here I will remark that I vary these quantities according to the seasons of the year, as the compound does not require to be made as hard in cold weather as it does in warm, but the variation is very slight. I mix and stir the whole of the above-named ingredients together and then grind and make them fine for use. When this compound is well ground it is about the consistency of common mortar, and can be spread and applied with great facility, with trowel or otherwise, to cloths, coat after coat, as fast as it dries. When the cloths are sufficiently thick I rub them down and print. When this compound is thereby dry it becomes very hard, and makes the best floor-cloths or floor-cloth carpet that I have yet seen. This, however, is not the only use it can be applied to, as this compound is good for roofing of buildings— the best probably yet known.

What I claim as my invention, and desire to secure by Letters Patent, is—

The use of this compound, or the application of the same to the making and manufacturing of floor-cloth carpets, substantially as set forth in this my specification.

Brooklyn, February 21, 1857.

J. W. HARMON.

Witnesses:
THOS. D. SHERWOOD,
THOS. H. MERCEIN.